United States Patent [19]

Dombrowski

[11] 4,110,910

[45] Sep. 5, 1978

[54] APPARATUS FOR SIMULTANEOUSLY MEASURING THE OUTER DIAMETER OF SETS OF PROFILED WHEELS

[75] Inventor: Theodor Dombrowski, Erkelenz, Germany

[73] Assignee: Wilhelm Hegenscheidt GmbH, Erkelenz, Germany

[21] Appl. No.: 746,867

[22] Filed: Dec. 2, 1976

Related U.S. Application Data

[63] Continuation of Ser. No. 525,374, Nov. 20, 1973, abandoned.

[30] Foreign Application Priority Data

Nov. 23, 1974 [DE] Fed. Rep. of Germany ....... 2358383

[51] Int. Cl.² ............................ G01B 3/12; G01B 5/10
[52] U.S. Cl. .................................. 33/141 R; 33/178 R
[58] Field of Search ............ 33/141 R, 141 B, 141 E, 33/141.5, 142, 174 R, 178 R, 174 L, 178 E

[56] References Cited

U.S. PATENT DOCUMENTS 480,607   8/1892   McCallum ..................... 33/141 B

FOREIGN PATENT DOCUMENTS

| 1,301,921 | 7/1962 | France ................................ 33/174 R |
| 523,470 | 4/1955 | Italy ..................................... 33/141 R |
| 142,441 | 11/1958 | U.S.S.R. ............................. 33/141 E |
| 228,967 | 2/1969 | U.S.S.R. ............................. 33/178 R |

*Primary Examiner*—Richard R. Stearns
*Attorney, Agent, or Firm*—Michael J. Striker

[57] ABSTRACT

To measure simultaneously the outer diameter of sets of profiled wheels which are formed by a turning operation and therefore provided with circumferentially extending grooves, an apparatus is provided having a pair of metering wheels which have respective cylindrical circumferential faces of nominally identical diameter and width. The width of each face is bisected by a plane intersecting the plane that encompasses the diameter to be measured, on a line tangent to this diameter.

The metering wheels are mounted for rotation about axes of rotation which extend parallel to the enveloping line in the plane to be measured.

2 Claims, 15 Drawing Figures

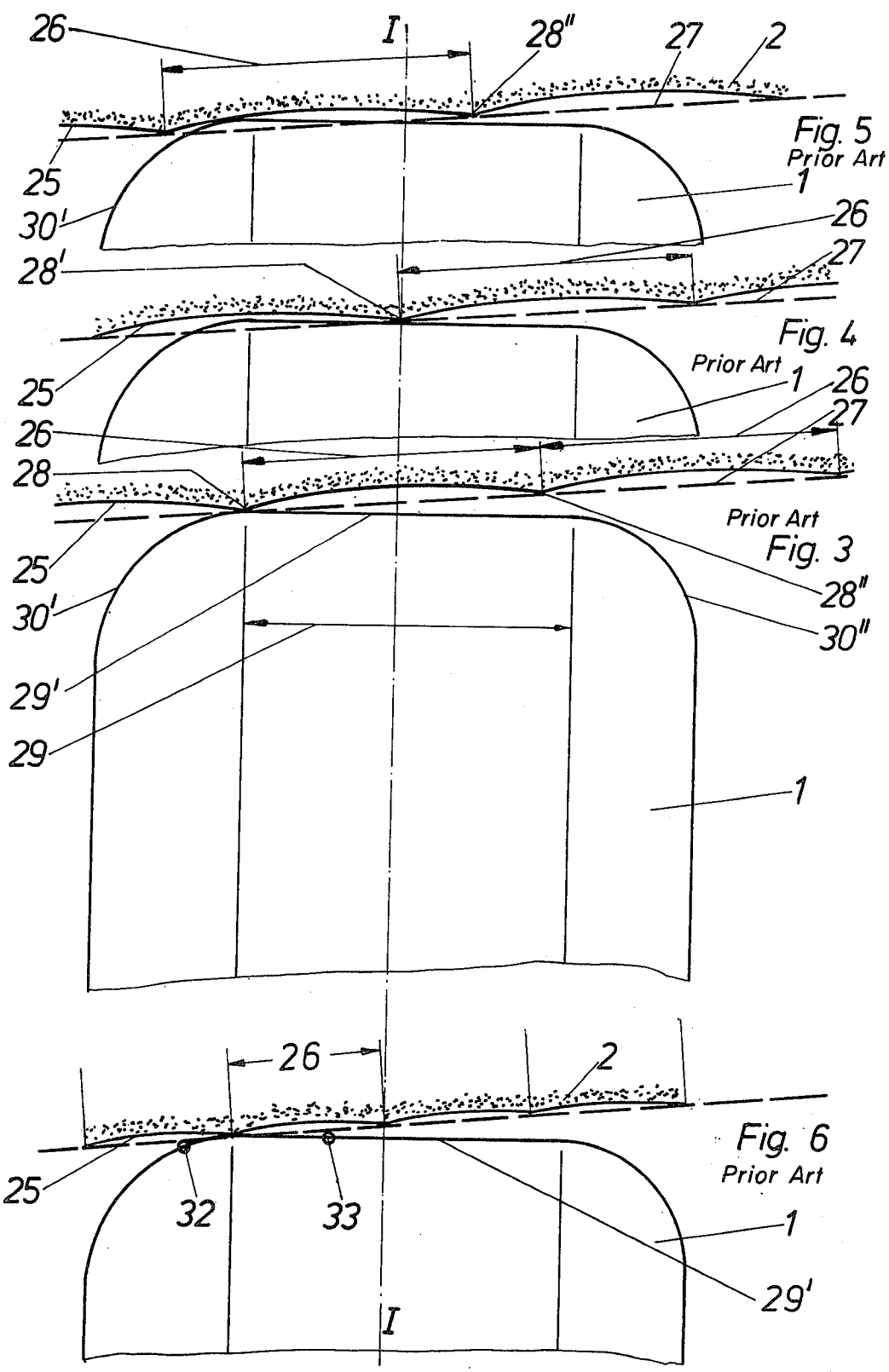

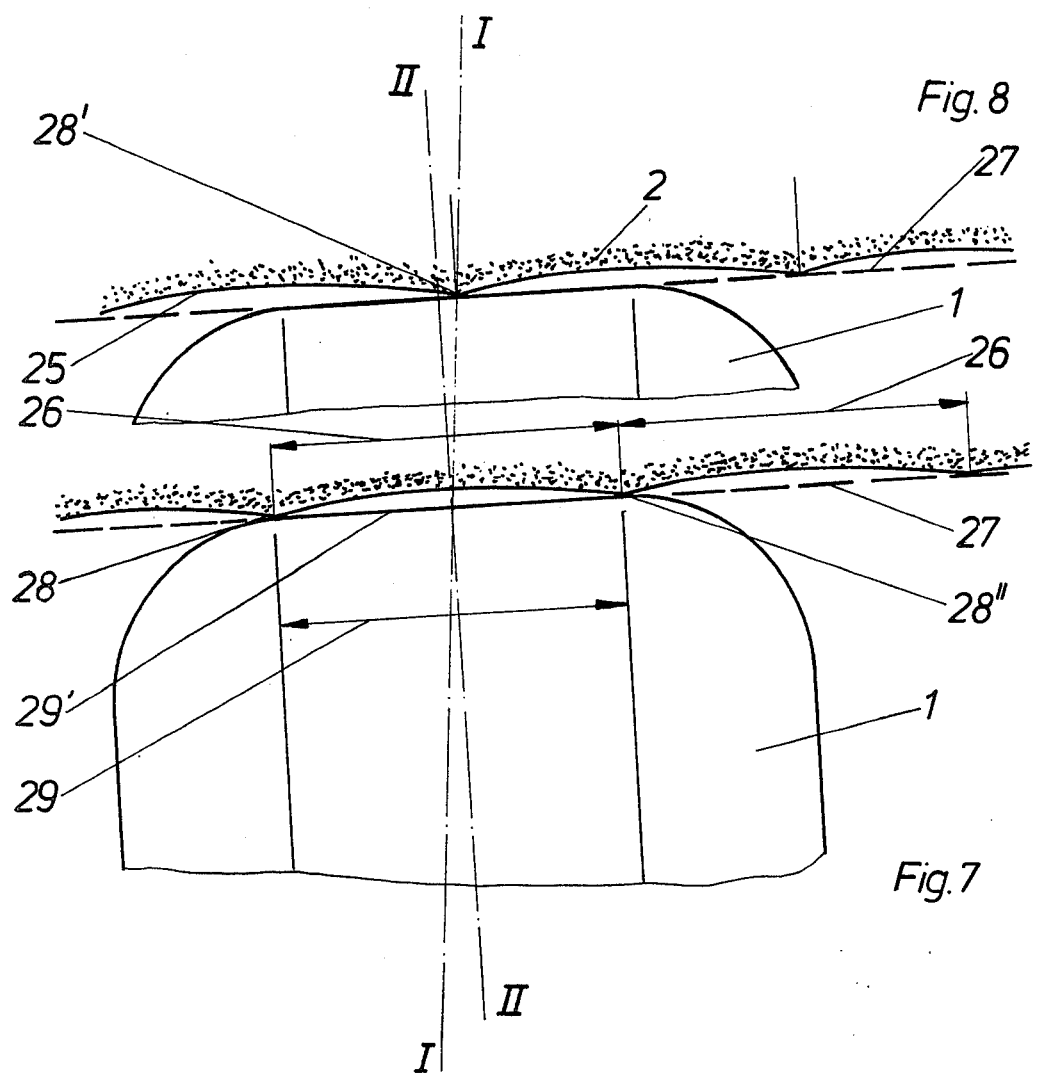

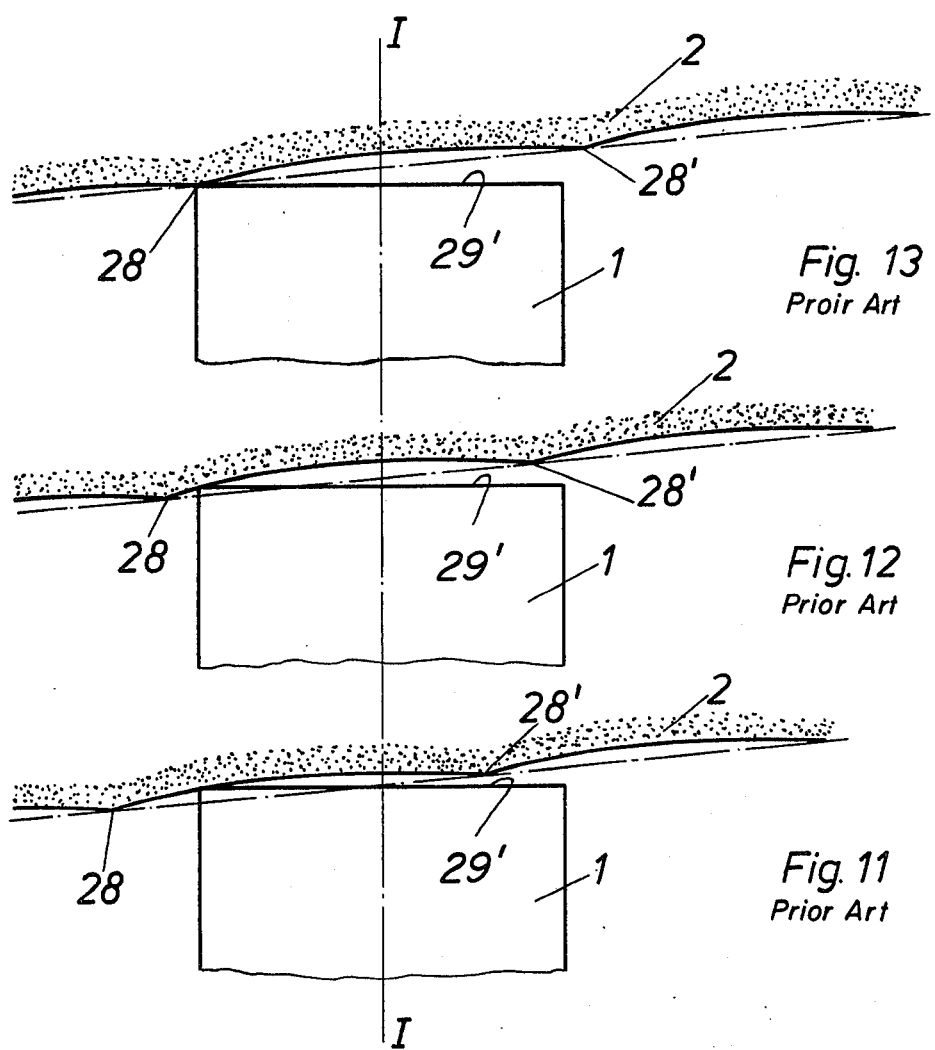

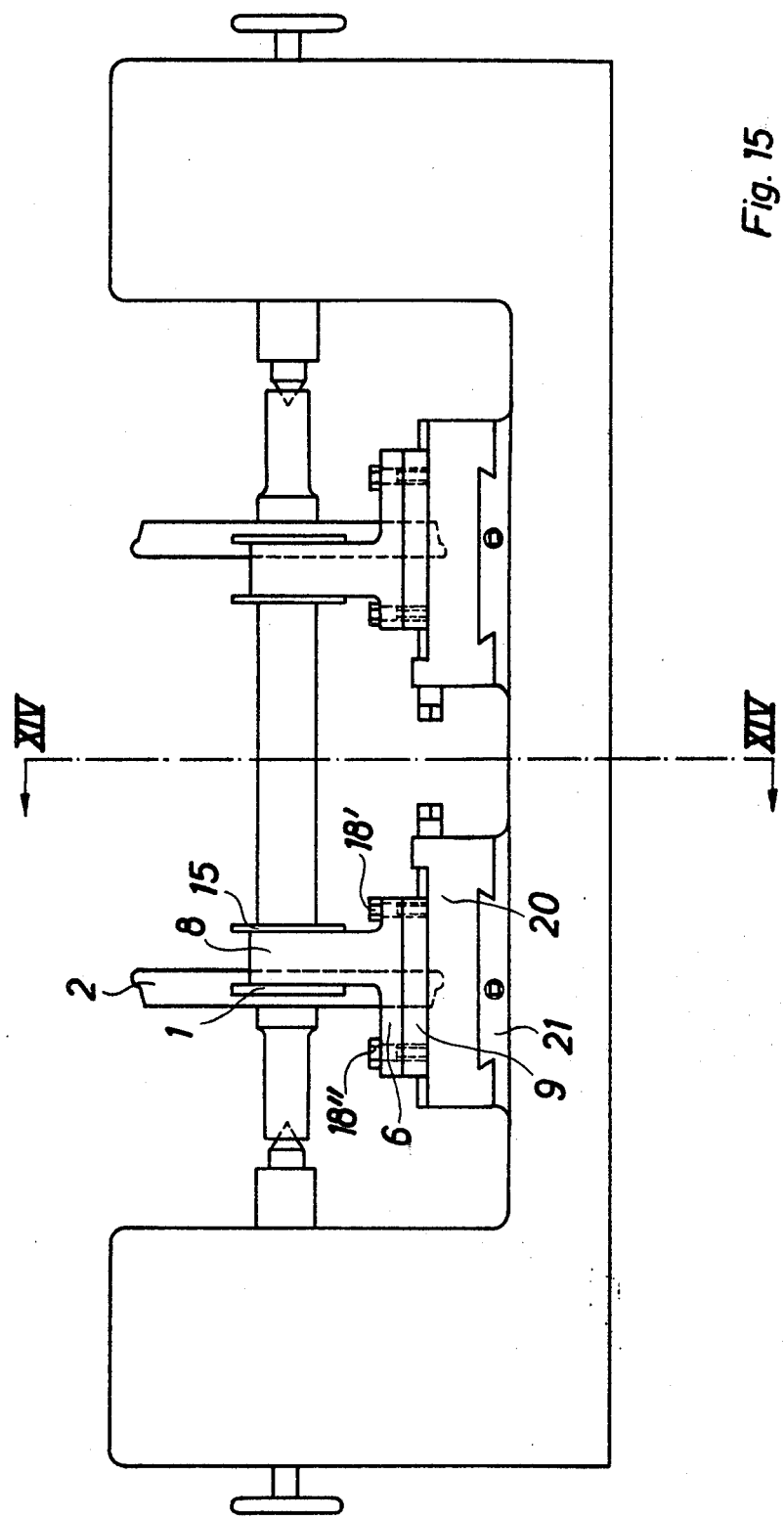

APPARATUS FOR SIMULTANEOUSLY MEASURING THE OUTER DIAMETER OF SETS OF PROFILED WHEELS

CROSS-REFERENCE TO RELATED APPLICATION

The present application is a continuation of application Ser. No. 525,374, filed Nov. 20, 1973, and now abandoned.

BACKGROUND OF THE INVENTION

This invention is concerned with an apparatus for simultaneously measuring the outer diameter of sets of profiled wheels which have been produced by a turning operation.

It is known from U.S. Pats. Nos. 3,307,265, 3,561,121 and 3,561,120 to carry out length measurements by means of metering wheels. In these prior-art devices, the metering wheels roll on precisely planar metering surfaces of a lathe or similar bed. These surfaces must be highly accurate if metering inaccuracies are to be avoided. Despite this, the cooperation between the surfaces and the metering wheels results in measuring inaccuracies which, after a to-and-fro movement of the respective metering wheel, make it difficult to place the zero-setting mark of the metering wheel in registry with the zero-setting mark of the surface on which the wheel is to roll. The overcome this problem, the prior-art devices form their metering wheels with convexly shaped circumferential surfaces.

These metering wheels may be pivoted about a pivot axis that extends vertically with respect to the metering surface, about a pivot axis that extends parallel to the elongation of the metering surface, or about both such axes. This permits the necessary adjustment of the metering devices to be made. The circumferential surfaces of the metering wheels are formed with transverse grooves which cooperate with the metering surface to more precisely guide the wheels thereon. The wheels drive a rotating signal-generating device which yields signals that are supplied to a counter from which the length of the distance being measured can be directly read off.

It has also been proposed to use such arrangements for measuring the diameter of an object. In all instances of devices using metering wheels, it has always been exclusively proposed to measure a single diameter or a single length in a certain measuring system (for purposes of this disclosure it will be assumed that the metric system is involved). This means that the metering device must also operate in the same measuring system, which means that metering-wheel diameter, dial divisions, etc. all have a fixed relationship to the measuring system in question, i.e. here the metric system. If the metering wheel becomes worn, as it inevitably does, this fixed relationship is lost and incorrect measurements will result.

A result of this is that in the prior-art devices which use metering wheels, the metering wheels must be replaced with new ones when they become worn to even a slight extent. This is expensive and in many instances will also require undesirable machine down-time. Of course, a certain amount of wear may be considered acceptable, but this requires that a concomitant degree of measuring error must also be tolerated.

This presents a substantial problem if such a device is to be used to measure the diameter of a set of wheels, especially rail-vehicle wheels, since the rather rough surfaces to be measured cause a very significant amount of wear for the metering wheels. This is especially true because the metering wheels must be pressed with a substantial force against the wheel surfaces being measured, to avoid "jumping" during the measuring operation and the concomitant measuring error resulting therefrom.

When a set of such wheels is to be measured, this is done to obtain accurate measurements of the diameters of both of the wheels. If this is done with metering wheels, they do not encounter either a planar surface of a cylindrical surface, as in the prior-art applications. Instead, the surfaces to be measured on such sets of wheels (e.g. rail-vehicle wheels) are rounded and may have cone angle which will differ from set to set if the same metering-wheel device is to be used to measure the diameters of wheel sets having different profiles. The surface quality of the wheels is produced in accordance with economic considerations, and does not take into account measuring accuracy. The surfaces to be measured are formed by a turning operation, which means that the cutting tool employed in this operation has formed these surfaces with spiral circumferentially extending grooves whose width and depth may vary from wheel set to wheel set, and even from wheel to wheel of one and the same set. The reason for the last-mentioned differences is that the turning machine, on which both wheels of a set are produced simultaneously, may have a differential feed rate for the tool associated with each wheel, that the cutting edges on the two tools may be of different dimensions, and that the degree of wear of these cutting edges may be different for the two tools.

It is known from "Industrieanzeiger", 1969, Nr. 79, pages 1925 ff, in an article entitled "Reibraddurchmesserverfahren", to use metering wheels to measure the outer diameter of rail-vehicle wheels. According to that disclosure, two metering wheels are used having axes which extend vertical with respect to the plane that encompasses the wheel diameter to be measured. The diameters of the metering wheels are produced very precisely. The metering wheels are coupled with a rotary signal generator which, in response to rotation of the metering wheels, generates for each rotation which it performs a number of signals that is so selected that the resolution capability of the measuring device in combination with the number of turns performed by the workpiece yields a decade number.

The known metering wheels of the prior art never have the width of their cylindrical circumference related to the measuring results. This means that this width is determined solely by manufacturing considerations. Similarly, the shape or the configuration of the cylindrical part of the metering wheel circumference to the axial endfaces has heretofore been completely disregarded with respect to the measuring results being obtained. It is, however, desired in the prior art that the axial center plane of the cylindrical part of the metering wheel coincide with the plane encompassing the diameter to be measured on the wheels of a wheel set.

However, those edges of the cylindrical part of the metering wheels which e.g. face toward the flange of wheel being measured, are located not in the plane of the diameter being measured, but in a different plane. This means that the diameter being measured by the metering wheel is not the diameter in the desired measuring plane, but a different diameter, so that the measured result will deviate from the result that should have been obtained and the correct diameter been measured. This deviation might be acceptable if shape-, positional- and measuring deviations were identical for both metering wheels of the measuring device. This, however, is not the case since the metering wheel widths and other dimensional factors are not controlled to be uniform, so that the planes in which the workpiece wheels are measured not only deviate from the plane of the desired diameter measurement, but deviate differently therefrom in respect of each of the metering wheels. It should be remembered that each metering wheel rolls with its circumference on the turned surface of the associated workpiece wheel, and more particularly, that it rolls on the crests of the circumferentially extending spiral grooves formed in this surface during the manufacture of the workpiece wheel. However, only those grooves will yield the accurate diameter whose crests, seen with reference to the circumference, are equally bisected into two parts by the measuring plane, i.e. the plane in which the diameter measurement is being taken. These grooves are very shallow and the rounded edge at that axial end of the metering wheel which faces towards the workpiece-wheel flange can enter into the groove and abut its bottom, whereas accurate measurement would require that the cylindrical part of the metering wheel circumference straddles the groove and rolls on the crests located at both axial sides of the groove.

These problems are aggravated by the fact that where a metering wheel has a cylindrical measuring-surface part whose width is narrower than the axial spacing between the crests bounding the opposite sides of the grooves in the workpiece wheel, the metering wheel will dip into the grooves and thus yield an inaccurate measurement, since the measurement is not taken, as desired, over the crests but in the grooves bounded by them. Moreover, it is never certain that the axial spacing of the crests bounding the respective grooves is identical on the two wheels of a set being measured, so that the metering wheel measuring one workpiece wheel may dip into the grooves thereof, whereas the metering wheel associated with the other workpiece wheel may measure the diameter over the crests thereof.

The problems encountered with the question of measuring accuracy are largely based upon the fact that the measuring accuracy is an important factor in the level of the peak-to-valley height required for the workpiece wheel surfaces.

The state-owned West German railroad, for example, requires a peak-to-valley height (Rt) smaller than 60 micrometers, at a permissible diameter difference of $\Delta D = 0.3$ mm. However, as the foregoing discussion has indicated, the measuring inaccuracies of the known metering-wheel devices are such as to fall within the impermissible range, so that mismeasurements cause unnecessary loss of expensive workpiece-wheel material.

The diameter-measuring problems could be reduced if the peak-to-valley height (Rt) of the turned surfaces on the workpiece wheels were to be improved. However, attempts to do so encounter economic considerations having to do with the manufacture of the workpiece wheels and precluding any significant improvements in the Rt factor. Therefore, this is not a viable solution to the problem.

SUMMARY OF THE INVENTION

Accordingly, it is an object of this invention to overcome the problems outlined above.

More particularly, it is an object of the present invention to provide an improved apparatus for simultaneously measuring the outer diameter of sets of profiled wheels which are produced by turning, and which apparatus overcomes the aforementioned difficulties.

In keeping with these objects, and with still others which will become apparent hereafter, one feature of the invention resides in such an apparatus for simultaneously measuring the outer diameter of sets of profiled wheels which are produced by turning and therefore have outer circumferential surfaces formed with circumferentially extending grooves. Briefly stated, the apparatus comprises a pair of metering wheels having respective cylindrical circumferential faces of nominally identical diameter and width, of which the width is bisected by a plane intersecting the plane that encompasses the diameter to be measured, on a line tangent to said diameter. The apparatus further comprises means mounting these metering wheels for turning movement about respective axes of rotation which extend parallel to the enveloping line in the plane to be measured.

Advantageously, a metering wheel with a cylindrical circumferential face will roll on the crests bounding the grooves in the workpiece wheels, i.e. the wheels of the set being measured. Since the effective measuring width of the metering wheel is at least equal to the spacing between the crests bounding the opposite sides of each groove, and since the cylindrical circumference of the metering wheel extends parallel to the circumference of the profile being measured on the workpiece wheel, a single rotation of the wheel set will cause the entire effective measuring width of the metering wheel to sequentially come into contact with a single turn of the crest, a plane bisecting which coincides with the plane that encompasses the diameter to be measured. Although, due to the contour of the surface being measured, the radius of the crest may increase or decrease, the cooperation of the crest with the cylindrical circumference of the metering wheel results in measuring of a median diameter which exactly corresponds to the diameter to be determined. In the event the workpiece wheel has a somewhat conical profiling of its circumferential surface, the invention avoids the possibility that an edge of the metering wheel might be the sole contact between the metering wheel and the workpiece wheel, thus eliminating the possibility that the measuring plane might be shifted in direction towards this edge and that the latter might enter into the grooves and contact the bottom surface thereof, causing measuring inaccuracies. It is advantageous to use metering wheels having circumferential faces which are identical for both wheels of the apparatus, with respect to their diameter as well as to their effective measuring width, are composed of a cylindrical part and of lateral parts located at opposite axial sides of the cylindrical part and curved on identical radii which are greater than the radius of the cutting edge of the tool which formed the grooves, wherein a plane bisecting the width of each metering wheel intersects a plane that encompasses the diameter to be measured, and wherein the width of the cylindrical part is at least equal to the smallest distance between the crests bounding the opposite sides of the grooves in the workpiece wheels.

The apparatus of the present invention makes it possible to obtain measurements of the desired accuracy with a single set of metering wheels, even though the width of the grooves may differ from one set of workpiece wheels to another, as long as the groove width is the same for the two workpiece wheels of the respective set.

A further advantage of the invention, resulting from the aforementioned configuration of the measuring face on the metering wheel, is to be seen in the fact that independently of the spacing between the crests bounding a groove, only a single helical turn of the crests is measured, so that a median diameter is indicated which corresponds to the diameter of the wheel set in the desired measuring plane. The difference measurement of the two workpiece wheels of the set is carried out with uniform accuracy, independently of the spacing of the crests. The absolute diameters are measured in the decade system at greater spacing of the crests. The measurements meet the requirement that great accuracy in the differential measurement of the two workpiece wheels be obtained, whereas lesser accuracy in the determination of the absolute workpiece wheel diameter is permissible. The metering wheels will never roll alternately on the crests and on the bottom of the grooves, but will always roll only at the crests.

The effective measuring width ($b$) of both metering wheels should be substantially equal to the value of the square root of the product of the permissible diameter difference $\Delta D$ of the workpiece wheels of the set, times the cutting edge radius ($r$) of the cutting tool used in turning of the workpiece wheels and hence in forming of the grooves ($b' = \sqrt{1.6 \cdot \Delta D \cdot r}$), and the permissible diameter difference ($\Delta d$) of the effective measuring width of the two metering wheels is about equal to the product of the nominal metering-wheel diameter ($d$) times 20% of the permissible diameter difference ($\Delta D$) of the diameters of the workpiece wheels and the metering wheels, divided by the nominal diameter ($D$) to be measured on the workpiece wheels $$(\Delta d = d/D \cdot 0.2 \cdot \Delta D).$$

It is advantageous if the shape and surface of the workpiece wheels, and the shape and size of the metering wheels, have a certain relationship, as follows:

$$Rt = \frac{s^2 \cdot 1000}{8 \cdot r} \qquad (1)$$

$$b = \sqrt{1.6 \cdot \Delta D \cdot r} \qquad (2)$$

$$\Delta d = d/D \cdot 0.2 \cdot \Delta D \qquad (3)$$

$D$: wheel set diameter to be measured (in mm)
$d$: metering wheel diameter (in mm)
$\Delta D$: permissible difference in case of both diameters (in mm) (this is predetermined)
$\Delta d$: permissible difference in the diameters of the metering wheels
$Rt$: peak-to-valley depth ($\mu$m)
$s$: advancement of the workpiece-wheel surface (mm/revolution)
$r$: radius of cutting-edge rounding on tool used to turn workpiece-wheels (in mm)
$b'$: effective measuring width of the metering wheels (in mm).

On both workpiece-wheel surfaces, turned at the same rate of advancement ($s$) in (mm/revolution), $$b' = s \qquad (4)$$

The relation (1) is known from the prior art and literature and is valid for turned cylindrical surfaces. Relation (2) was developed because of the realization that not every peak-to-valley height ($Rt$) of the workpiece-wheel surface permits any desired value for $\Delta D$, but that a small value for $\Delta D$ requires a small peak-to-valley height ($Rt$). In practical applications, a reasonable value for $Rt$ has been found to be about 20% of $\Delta D$. This, therefore, leads to the relation $$Rt = 0.2 \cdot \Delta D \cdot 1000 \qquad (5)$$

The factor 0.2 could of course be replaced by the general factor "$a$" which may have any desired value, but the factor 0.2 has in actual practice been found to be highly advantageous.

When the relations (4) and (5) are incorporated in (1), the following is obtained:

$$s = \sqrt{1.6 \cdot \Delta D \cdot r} \qquad (6)$$

This relation (6), wherein $\Delta D$ is predetermined, known and hence constant for this purpose, indicates the required rate of advancement ($s$) at which the workpiece wheels should be turned. This rate ($s$) is advantageously the highest that is possible and economically practicable.

The following Table 1 shows the results obtained on the basis of the aforementioned considerations:

TABLE 1

| D mm | d mm | ΔD mm | r mm | Rt μm | s mm/rev | Δd mm |
|---|---|---|---|---|---|---|
| 1000 | 100 | 0.3 | 4 | 60.0 | 1.40 | 0.006 |
| 1000 | 100 | 0.5 | 4 | 100.0 | 1.80 | 0.01 |
| 1000 | 100 | 1.0 | 4 | 200.0 | 2.55 | 0.02 |

The relationships expressed in equations (1) to (6) are not absolutely rigid, but may be varied within certain limits. Thus, relatively substantial variations are permissible for ($s$) and ($b'$) since any errors in these values are reflected in the measured results only in an insignificant deviation.

According to the invention, the actual diameters of the metering wheels are identical but need not precisely correspond to their decadic nominal diameter.

The construction of the metering wheels as proposed by the invention also increases their lifetime, because material in excess of the decadic nominal diameter may wear away, and material below the decadic nominal diameter may wear away, without affecting the accuracy of measurement in a detrimental manner. Furthermore, the metering wheels of a set may be reworked, e.g. by grinding, in order to restore them both to a condition in which they have identical diameters.

While it is true that the diameter of a pair of working wheels in a set is not measured with absolute exactitude according to the invention, the error is only very small and amounts to ±0.1% if the metering wheels have, for example, a diameter of 100.1 mm (rather than 100 mm) and are used until they are worn to a diameter of 99.9 mm.

It is advantageous if the diameter of the metering wheels is equal to or greater than 20% of the workpiece-wheel diameter to be measured, since a large metering-wheel diameter yields more accurate measuring results than a smaller one.

For example: in all cases a workpiece-wheel diameter of exactly 1000 mm is to be measured. A metering wheel diameter of 50 mm will result in a workpiece-wheel diameter measurement of 1000; a metering wheel diameter of 200 mm will also result in a workpiece-wheel diameter measurement of 1000 mm. If one uses a metering wheel having a diameter of 50.01 mm, and there is a difference in the diameters of the two metering wheels of the apparatus of 0.01 mm, then the measuring error will amount to 0.2 mm, a value that is unacceptably high. However, if a metering wheel is used having a diameter of 200.01 mm and if there is a difference of 0.01 mm between the diameters of the two metering wheels, then the measuring error will be 0.05 mm, i.e. it will amount to only 25% of the previously mentioned measuring error, while yet the difference in the diameters of the two metering wheels will be absolutely identical.

By referring to the following Tables 2 and 3 it is therefore clear that it is possible for a user to reduce the error range mentioned in their columns 3 and 4 by one half, simply by selecting a metering wheel having a diameter $d=200$ mm. Thus, the error range found in columns 3 and 4 of Tables 2 and 3 can be reduced by a user to a value acceptable for a given application by merely selecting an appropriate metering wheel diameter.

TABLE 2

| $\Delta D_{permiss}=0.3$ | D = 1000 mm | d = 100 mm | |
|---|---|---|---|
| 1 | 2 | 3 | 4 |
| Measured Difference | Error from | Actual Difference | |
| $\Delta D$ | $\Delta d = 0.006$ | $\Sigma 1 + 2$ | $\Sigma 1 - 2$ |
| 0 | 0.06 | 0.06 | −0.06 |
| 0.06 | 0.06 | 0.12 | 0.00 |
| 0.12 | 0.06 | 0.18 | 0.06 |
| 0.18 | 0.06 | 0.24 | 0.12 |
| 0.24 | 0.06 | 0.3 | 0.18 |
| 0.3 | 0.06 | 0.36 | 0.24 |

TABLE 3

| $\Delta D_{permiss}=0.5$ | D = 1000 mm | d = 100 mm | |
|---|---|---|---|
| 1 | 2 | 3 | 4 |
| Measured Difference | Error from | Actual Difference | |
| $\Delta D$ | $\Delta d = 0.01$ | $\Sigma 1 + 2$ | $\Sigma 1 - 2$ |
| 0 | 0.1 | 0.1 | −0.1 |
| 0.1 | 0.1 | 0.2 | 0.0 |
| 0.2 | 0.1 | 0.3 | 0.1 |
| 0.3 | 0.1 | 0.4 | 0.2 |
| 0.4 | 0.1 | 0.5 | 0.3 |
| 0.5 | 0.1 | 0.6 | 0.4 |

The use of a larger-diameter metering wheel, as compared to smaller-diameter one, has the further advantage that the wear of a large-diameter metering wheel will be lower than that of smaller-diameter wheel by the square of the difference between their diameters, since each portion of the wheel circumference comes less frequently into contact with the surface to be measured, and because given identical pressure contact with the surface to be measured the metering wheel area contacting the surface is greater than for the smaller wheel, in accordance with the relationship $$F_W = f_W \cdot B_W \cdot d_W \qquad (7)$$

$$1/d_W = 1/D + 1/d \qquad (8)$$

wherein $F_W$ = pressure force of the metering wheel (N)
$f_W$ = specific pressure against the surface (N/mm²)
$d_W$ = resulting diameter (in mm)
$B_W$ = width of the contact area between metering wheel and surface of workpiece wheel (in mm).

In equation (7) the values of $F_W$ and $B_W$ are to be considered constants, because the force $F_W$ and the width $B_W$ are independent of the diameter of the metering wheel. Further, it is known from practical experience that the wear of the metering wheel is proportional to the specific force ($f_W$) with which it is pressed against the surface to be measured, so that ($f_W$) can be accepted as a measure of the wear involved. The value of ($d_W$) increases in the practically usable range at a greater than proportional rate as ($d$) increases. Equation (7) can then be written as $$F_W/B_W = C = f_W \cdot d_W \qquad (9)$$

where C is a constant. This equation shows that increasing values of ($d_W$) or ($d$) result in a greater than proportional reduction of the value ($f_W$), i.e. of the wear.

It is also advantageous if each of the two metering wheels of the apparatus is pivotable about a pivot pin or the like, whose axis extends vertical with respect to a plane passing through the axes of rotation of the workpiece wheels and of the metering wheels and extends tangent to the tread circle diameter to be measured. If the apparatus is constructed in this manner, it can be used to measure workpiece wheels having various different profiles wherein the profile inclination at the plane of measurement varies, since the metering wheels can be appropriately adjusted with such a construction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 3–5 are enlarged, fragmentary sectional views, illustrating three different phases of the contact between a metering wheel of the prior art and the surface of workpiece wheel, during the measurement of such surface;

FIG. 6 is a view analogous to FIG. 3, again showing the prior art, but illustrating the circumstances which obtain when the grooves on the workpiece-wheel surface are closely spaced;

FIGS. 7–8 are views analogous to FIGS. 3 and 4, but showing the operation of the apparatus according to the present invention;

FIGS. 11–13 diagrammatically show the rolling of a sharp-edged metering wheel on a surface of a workpiece wheel;

FIG. 15 is a somewhat diagrammatic side view of the complete apparatus shown in FIG. 1.

DESCRIPTION OF THE PREFERRED EMBODIMENTS

Figure 1:
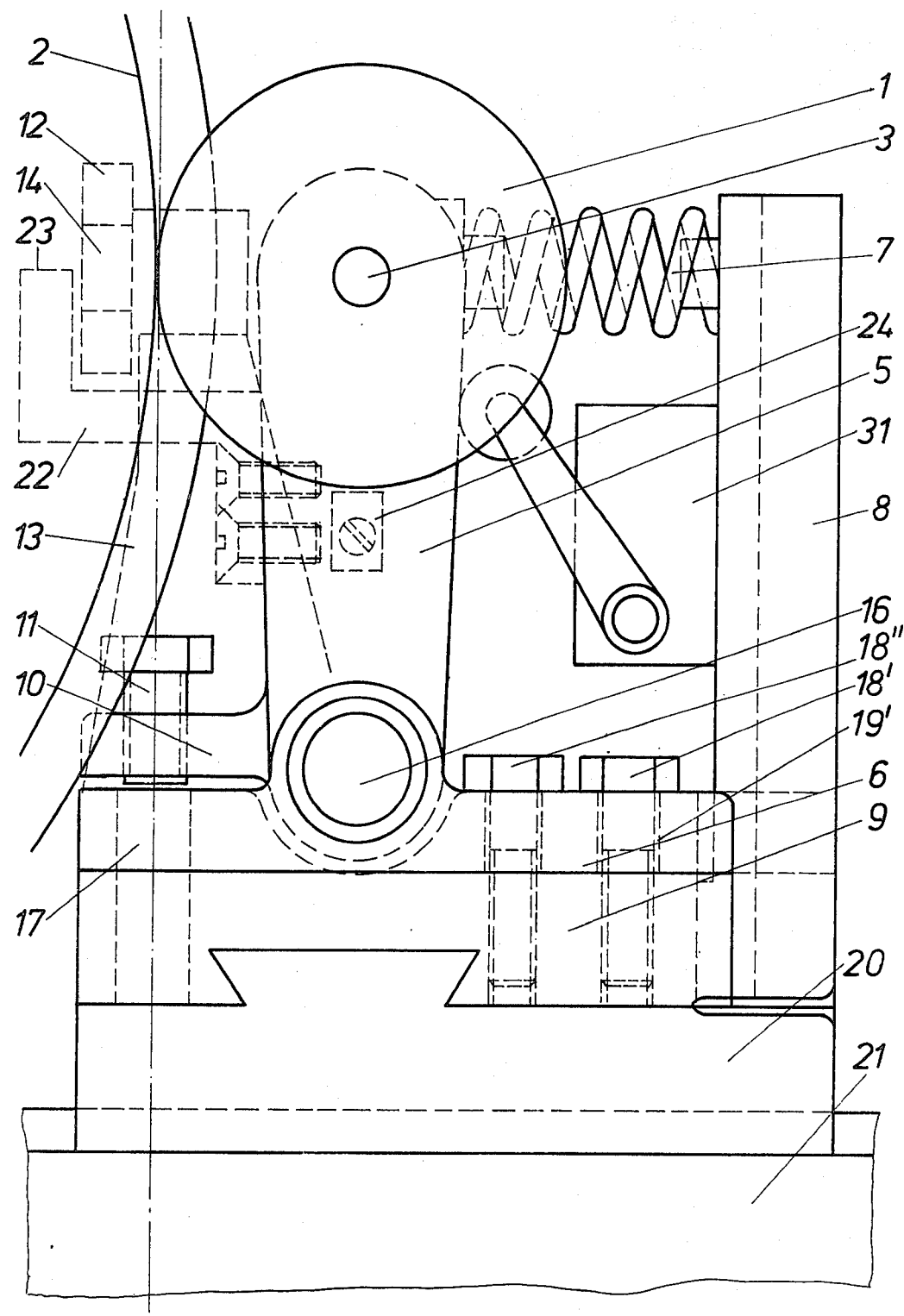
FIG. 1 is a somewhat diagrammatic side view of an apparatus according to the invention.
Figure 2:
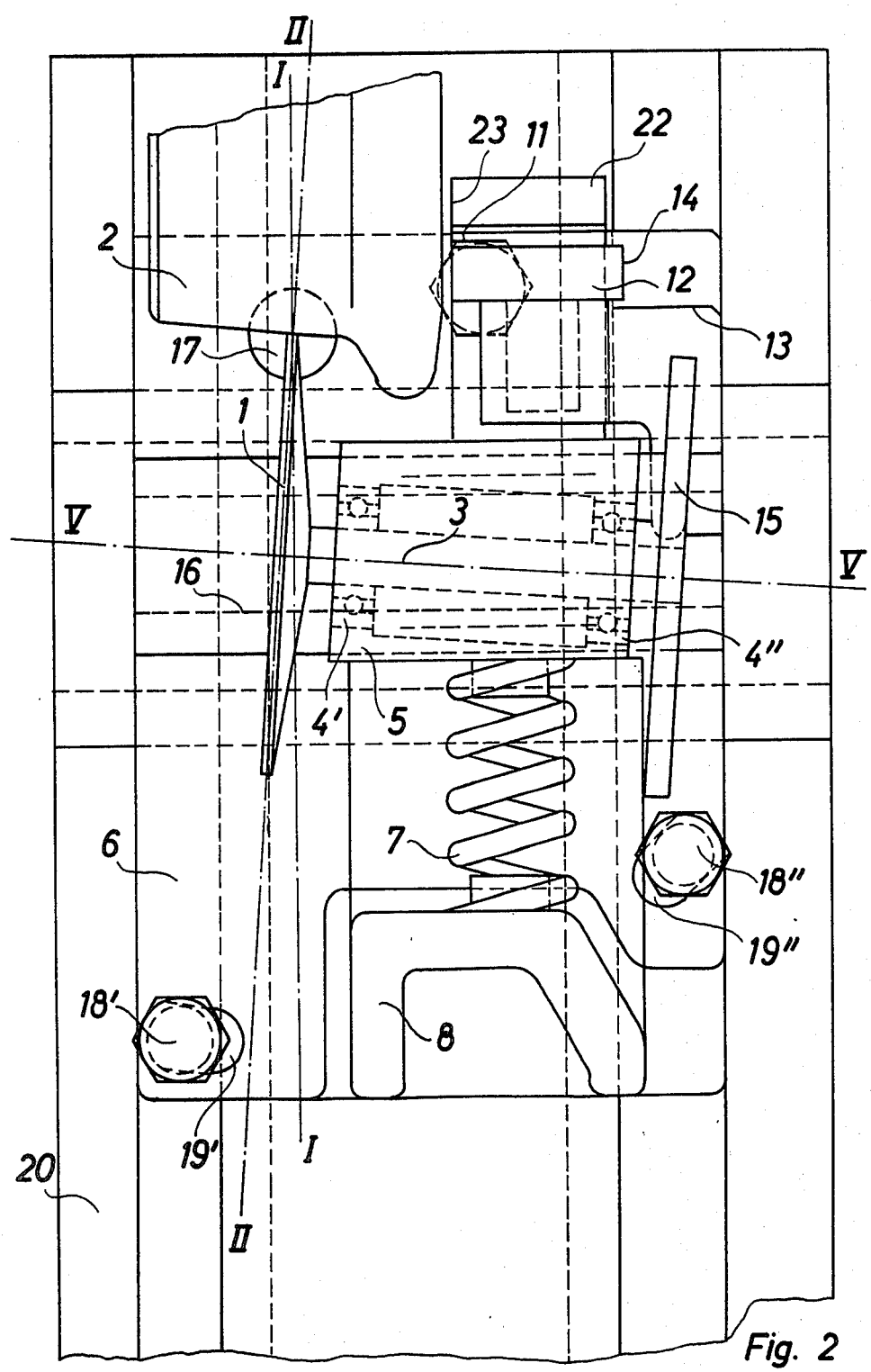
FIG. 2 is a top-plane view of FIG. 1.
Figure 14:
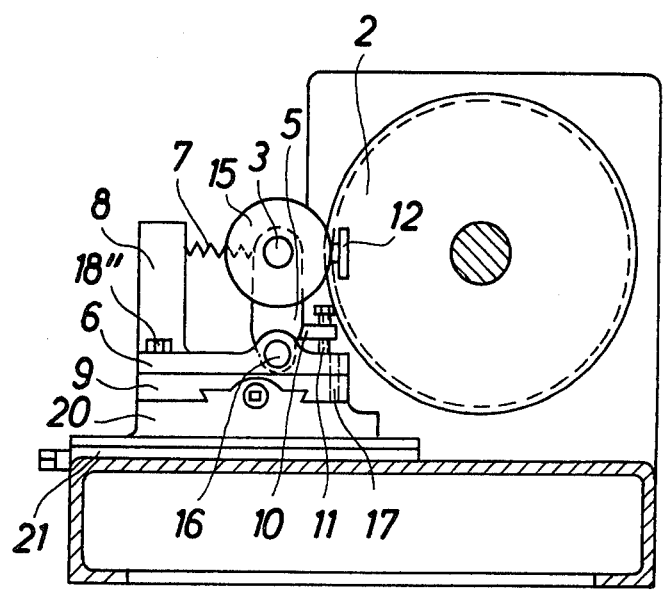
FIG. 14 is a section on line XIV—XIV of FIG. 15.

Referring firstly to FIGS. 1, 14 and 15 of the drawing, it will be seen that these Figures illustrate an apparatus according to the present invention. The apparatus has two metering wheels 1 each of which has its periphery in rolling contact with the track-engaging surface of a workpiece-wheel for rail vehicles, and in particular with the wheel rim 2 thereof. These workpiece wheels are to be measured as to the diameter of their rims 2 in a set, that is two of the wheels are to be measured simultaneously. Each of the metering wheels 1 is fixedly mounted on the shaft 3 which is rotatably journalled in an arm 5 by means of bearings 4', 4" so as to have freedom of rotation but being prevented from axial displacement. The arm 5 in turn is swingable about a shaft 16 which is mounted in a support 6. The arm 5 is supported by a spring 7 which is mounted on an arm 8 of a longitudinal slide 9; an angled portion 10 of the arm 5 has a screw 11 mounted in it which when the apparatus is not in use engages the support 6. A spacing roller 12 is mounted on an arm 13 of the slide 9 so as to be rotatable but without freedom of axial displacement. A flat segment 14 has been removed on the roller 12 to prevent the roller 12 from turning throughout the entire time of rotation of the workpiece wheels.

A broken line I—I indicates the plane in which the diameters of the wheel rims are to be measured. A further line II—II extends at right angles to the profile inclination at the plane of measurement and identifies the central plane of the effective measuring surface of the respective metering wheel 1. The lines I and II intersect at a point which is located on the profile of the respective wheel rim 2. This point of intersection is spaced from the circumference of the roller 12 by a distance which corresponds to the distance between the measuring plane and the back of the wheel rim 2. A dial 15 is mounted on a remote end of the shaft 3 and cooperates with an indicator 24 that is carried by the arm 5. The diameter of the respective metering wheels 1 is advantageously selected in full decimeters (i.e. tenth of a meter) and the dial 15 is accordingly provided with separations in a decadic sequence.

Figure 10:
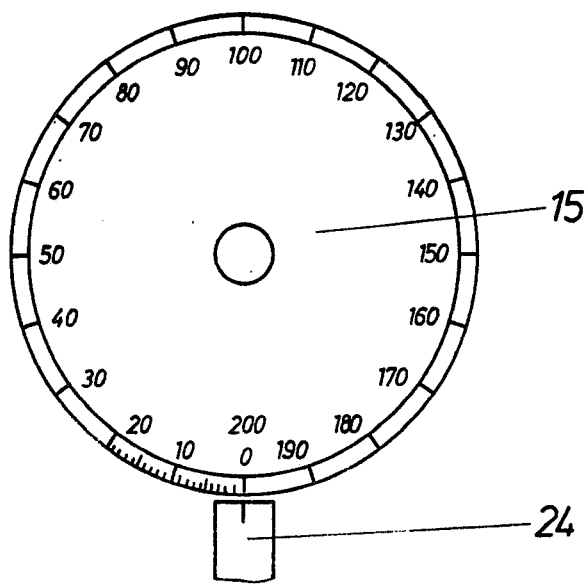
FIG. 10 is an elevation, showing the scale gradations on the dial associated with a metering wheel according to the invention.

In the illustrated example the diameters of the metering wheels 1 are 200 mm (= 2 dm), and as FIG. 10 shows the surface of the dial 15 is subdivided by 200 indicating lines (only some shown) so that the spacing between two consecutive ones of these indicating lines corresponds to a diameter of the wheel rims 2 of 1 mm, whereas the physical spacing between consecutive ones of these lines of course equals 3.15 mm. If the area located between two consecutive ones of these lines is further subdivided into three parts, then the newly obtained lines are then approximately 1 mm from one another in circumferential direction of the dial 15. In such a case, it is clear that during a single rotation of the wheel rims 2 a resolution accuracy of 0.33 mm can be obtained. If for measurement purposes the wheel rims 2 are allowed to perform ten revolutions, then the resolution accuracy equals 0.033 mm.

The support 6 is mounted so as to be pivotable about a pin 17 or analogous element which is mounted in the slide 9 and the axis of which is vertically arranged with respect to a plane passing through the axis on which the wheel rims 2 rotate and the axis on which the two metering wheels 1 rotate. The pivot axis defined by the pin 17 further extends tangent to the tread circle diameter to be measured. The support 6 is mounted by means of screws 18', 18" which extend through slots 19', 19" in the support 6. The arrangement of the pin 17 makes it possible to so adjust each of the metering wheels 1 for each and every profile inclination on the wheel rims 2 that is in practice encountered, that the plane II—II will extend vertical with respect to the profile portion whose diameter is to be measured. The slide 9 slides on guides of a cross slide 20 which in turn slides on transverse guides of a base 21 which may be mounted on a machine bed or the like (not shown). On the arm 5 which is the right-hand one, as seen from the operator side of the apparatus, a tracing ruler 22 is secured, having an edge 23 which is located exactly at the height of the centers of the machine.

Of course, it will be understood that each of the metering wheels 1 has one of the slides 9 and slides 20, and other associated components described above, associated with it.

In operation of this apparatus, a handwheel (which drives a spindle to move the slides 9 and 20, neither the wheel nor the spindle being shown for the sake of simplicity because they are known) is turned in order to adjust the respective metering wheel 1 and place it near the profile to be measured. The metering wheel 1 has previously been adjusted to extend parallel to the wheel rim 2 profile by pivoting it about the pivot axis of the pivot 17. The handwheel for the slide 9 is then turned until the roller 12 is in contact with the surface at the back of the respective wheel rim 2, and this assures that the metering wheel 1 displaces the respective metering wheel 1 into the precise desired longitudinal position relative to the profile of the wheel rim 2 associated with it. The cross slide 20 is then further shifted until the screw 11 is moved away from the support 6 by approximately 1 mm. In this position an end switch 31 is operated which either deactivates motors that move the slides 9 and 20 or which signals the appropriate indicators (not shown) that the proper position for the respective metering wheel 1 has been reached.

At this time the spring 7 exerts a precisely predetermined force urging both of the metering wheels 1 with identical pressure against the respectively associated wheel rims 2. It permits sufficient yielding of the metering wheels 1 to compensate for irregularities in the profile of the respective wheel rim 2. The ruler 22 is now used to provide (with a stylus or the like) a mark on the wheel back of the right-hand wheel rim 2, and the metering wheels 1 are turned until the zero indicator on the dial 15 registers with the indicator 24. Now, the main drive motor (not shown) is activated and, shortly before the required number of revolutions has been completed by the wheel rims 2, the motor is deactivated again. The wheel rims 2 are then manually turned until the mark previously made with the stylus coincides with the edge of the roller 22 (this can of course also be done by operating the motor) and the result can now be read off the dial 15. The sum of the millimeters resulting from the full revolutions performed by the wheel rims 2, plus the number of the millimeters indicated as the result of the manual turning is divided by the number of revolutions performed by the wheel rims 2 and indicates the diameter being measured.

The operation of the apparatus will be understood in better perspective if it is related to the prior art.

Metering wheels used according to the prior art were never manufactured with any particular regard being given to the width of their effective metering surfaces, as previousliy pointed out. This width was always determined by manufacturing considerations. These metering wheels all have a central cylindrical circumferential surface which is joined at the opposite axial sides by rounded surface portions that merge into the respective end faces of the metering wheel. FIGS. 3, 4 and 5 show the use of such a prior-art metering wheel during three phases of a metering operation, on a much enlarged scale and during the measurement of the circumferential surface of a turned wheel rim 2. With respect to the apparatus of the prior art, the metering wheel is here also identified with reference numeral 1; it has a cylindrical circumferentially extending measuring face 29' having the width 29. To the left and to the right of this face 29' there are rounded surface portions 30' and 31" of differential sizes. The central plane of the face 29' coincides with the plane in which the diameter of the wheel rim 2 is to be measured; this latter plane is identified by the broken line I—I. The profile inclination is indicated by the broken line 27 which extends over the crests bounding the grooves that are formed in the surface of the wheel rim 2 as a result of the turning operation and the action of the turning or cutting tool. These crests are identified with reference numeral 28 and it will be seen that in FIG. 3 one such crest just engages the face 29' of the metering wheel 1. After a partial revolution of the wheel rim 2 this crest 28 has travelled to the position 28' and is located in the plane I—I, as shown in FIG. 4. FIG. 5 shows that after a further partial revolution of the wheel rim 2, the rounded surface portion 30' of the metering wheel 1 enters into the groove and engages the bottom surface 25 thereof. This means that the cylindrical surface part 29 of the metering wheel 1 can follow the crest 28 to the position 28', but it cannot follow it to the position 28" shown in FIG. 5.

To obtain a precise measurement of the diameter of the wheel rim 2 it is necessary that that crest be measured, the circumference of which is bisected over a complete revolution of the wheel rim 2 by the plane I—I, with the face 29' being in contact with this particular crest. However, it will be noted that the crest at the location 28" is not measured by the face 29' in FIG. 5, because it is not engaged thereby. Instead, the rounded portion 30' of the metering wheel 1 engages the bottom face 25 of the groove, and it follows that a precise measurement is not possible since the wheel 1 measures a diameter other than the one that is required to obtain such a precise measurement.

Moreover, a precise measurement can be obtained only if it is exclusively the cylindrical circumferential face 29' of the metering wheel 1 which is in engagement with the crests, whereas the rounded portion 30' will indicate a smaller diameter when it participates in the measurement.

Also, the cylindrical face 29' of the metering wheel 1 is wider than the spacing 26 between consecutive crests bounding the grooves, and FIG. 6 shows particularly clearly that and how this results in a measuring error. In these circumstances the diameter measurement is no longer carried out in the plane I—I, but in a plane which is parallel to this plane and is located between points 32 and 33. The measurement error which results from this depends, inter alia, upon the profile inclination and may assume quite substantial values. The profile inclination itself is subject to variations which may differ in the two wheels of a set of wheel rims 2, so that a further error is included in the final measurement since a differential profile inclination causes the plane in which the diameter of the wheel rims 2 is actually being measured, to be located at different distances from the desired plane I—I.

The same difficulties as described with FIGS. 3–6 also obtain with respect to prior-art metering wheels 1 which do not have the rounded portions 30', 30". This is shown in FIGS. 11, 12 and 13 which show the same circumstances as FIGS. 3, 4 and 5, respectively. It is clear from FIGS. 11–13 that the same problems are encountered with the type of metering wheel 1 shown therein. An additional problem with the type of metering wheel shown in FIGS. 11–13, which has sharp edges at the juncture between the portion 29' and the edge faces or axial end faces of the metering wheel 1, results from the fact that this sharp edge will wear quite rapidly and will become rounded to a greater or lesser degree, but in an unpredictable manner. Given these conditions, and taking into account the fact that errors in the profile inclination of the wheel rims 2 are almost unavoidable, it is clear that the final error which is included in the measurement will be such that it cannot even be calculated, so that the measurement is totally unreliable. It goes without saying that a similar difficulty is obtained if a metering wheel is used whose cylindrical face 29' has a width 29 which is so narrow that it will fit into the grooves intermediate the crests 28 thereof.

The aforementioned difficulties cause measuring errors of different magnitudes for each of the two metering wheels of the apparatus. This means that errors will result both in determining the diameter difference between the wheel rims 2 of a set of workpiece wheels, as well as in determining the absolute diameter of each wheel rim 2. Given the fact that the width 29 as well as the size of the radii of the portions 30', 30" heretofore have not been at all considered in relation to the measurements being taken, it is clear that differences in the width 29 between the two metering wheels of a single apparatus, and differences in the radii of the portions 30', 30" of the two wheels can result in the indication of diameter differences between the wheel rims 2 of a set of wheels which are not in actual fact in existence, and which result from the fact that due to the aforementioned differences between the two metering wheels each wheel will measure its associated wheel rim 2 in a plane different from the plane in which the other wheel measures its associated wheel rim 2. Due to the profile inclination this will result in the indication of different diameters.

FIGS. 7 and 8 show that according to the present invention the effective width 29 of the cylindrical circumferential measuring face 29' is at least equal to the distance 26 between two adjacent crests 28 bounding a groove on the wheel rim 2 to be measured. The centre plane II—II of the effective measuring face 29' extends at right angles to the profile tread inclination and intersects the measuring plane I—I in a cine which extends tangent to the tread circle diameter being measured. During one revolution of the set of workpiece wheels having the wheel rims 2, the measuring face 29' sequentially travels over the crests 28, 28' and 28" the circumference of which is bisected by the plane I—I. This assures a reliable and totally accurate measurement in accordance with the explanations previously given.

It should be understood that the width 29 of the measuring face 29' in FIGS. 7 and 8 is advantageously identical with the distance 26 between the adjacent crests 28, 28'. This is the ideal condition for measuring one diameter. If the width 29 is greater than the dimension 26, then the measurement of the diameter is subject to an error the size of which depends upon the difference of the width 29 less the dimension 26. The development of this error is the result of certain readily explainable factors. The diameter of a wheel for a rail vehicle must be measured in a precisely predetermined plane, the measuring plane I—I. A condition for such proper measurement is that the axes of rotation of the respective metering wheel 1 extend parallel to the profile of the workpiece wheel, that is parallel to the line 27 identified in FIG. 7. However, in practical use such parallelism cannot be obtained with absolute accuracy. Due to this lack of precise parallelism, the plane in which the diameter of the wheel rim 2 is actually measured differs from the desired measuring plane I—I. This is shown in an extreme case in the previously described FIG. 6, where the helical crest bounding the grooves in the wheel rim 2 extends between the points 32 and 33, and where it is clear that the actual measurement being taken is not being taken in the desired plane I—I. It should be kept in mind that the value of the error that results is not dependent upon the magnitude of the parallelism error. The value of the error occurs whenever there is an error in the desired parallelism, but its own value is dependent upon the previously explained width difference between the width 29 and the dimension 26.

The purpose of the present invention is not primarily to determine the diameter of a single wheel rim 2, that it is not to determine the absolute diameter of a particular wheel rim 2, but to determine the diameter difference between the two wheel rims 2 of a set of rail vehicle wheels. This is so because the factor which is of prime importance for the proper functioning of a cooperating set of wheels of a rail vehicle is not the absolute diameter of one or the other of the rail vehicles, but the difference between the diameters of the two wheels. This diameter difference is obtained by subtracting the value of the smaller measured absolute diameter from the value of the larger measured absolute diameter.

The two measuring devices used for measuring the diameters of the two working wheels of a set of rail vehicle wheels, which devices each have one of the metering wheels 1 as shown for example in FIG. 15, are coupled mechanically, electrically or electronically for joint operation. To assure a reliable measuring result, the aforementioned measuring error must not exceed a certain fraction of the permissible diameter difference between the two working wheels of a wheel set. Since the magnitude of the measuring error can in effect be selected at will within a certain range in dependence upon the permissible diameter difference, and since the magnitude of the measuring error is directly dependent upon the aforementioned difference between the dimensions 26 and 29 that is acceptable can be predetermined. Assuming that the spacing 26 remains constant on the two wheels of a set of working wheels, the maximum width 29 that is permissible can be readily determined. In so doing it must be kept in mind that the same measuring error will occur for both of the wheels 1 of the apparatus, and that at the different wheels it may be of inverse sign, that is at one wheel 1 the measured diameter may be smaller than the actual diameter and at the other wheel 1 the measured diameter may be larger than the actual diameter. The total error introduced by both of the wheels 1 must not exceed the permissible fraction of the permissible diameter difference between the two working wheels of a set.

The dimension 29 of each of the wheels 1 must not be smaller than the dimension 26, and it must not be greater than the dimension 26 beyond a certain extent. When calculating the dimension 29 it must be taken into account, as already pointed out, that the measuring errors of the two metering wheels 1 of an apparatus are additive, and if the cylindrical width 29 of both of the metering wheels 1 is located within the range that could be predetermined on the basis of the previous explanations, the measuring results obtained by measuring the working wheels of a set will be sufficiently accurate for all practical purposes.

Of course, it is evident that a diameter difference between the diameters of the two metering wheels 1 themselves will also falsify the resulting measurement of the diameters of the working wheel rims 2. In actual practice it will never readily be possible to have the diameters of the metering wheels 1 be identical, so that an error from this source also cannot be excluded, but since the permissible measuring error can be calculated as explained before, this error resulting from a diameter difference between the two metering wheels 1 can be included in such a calculation.

Figure 9:
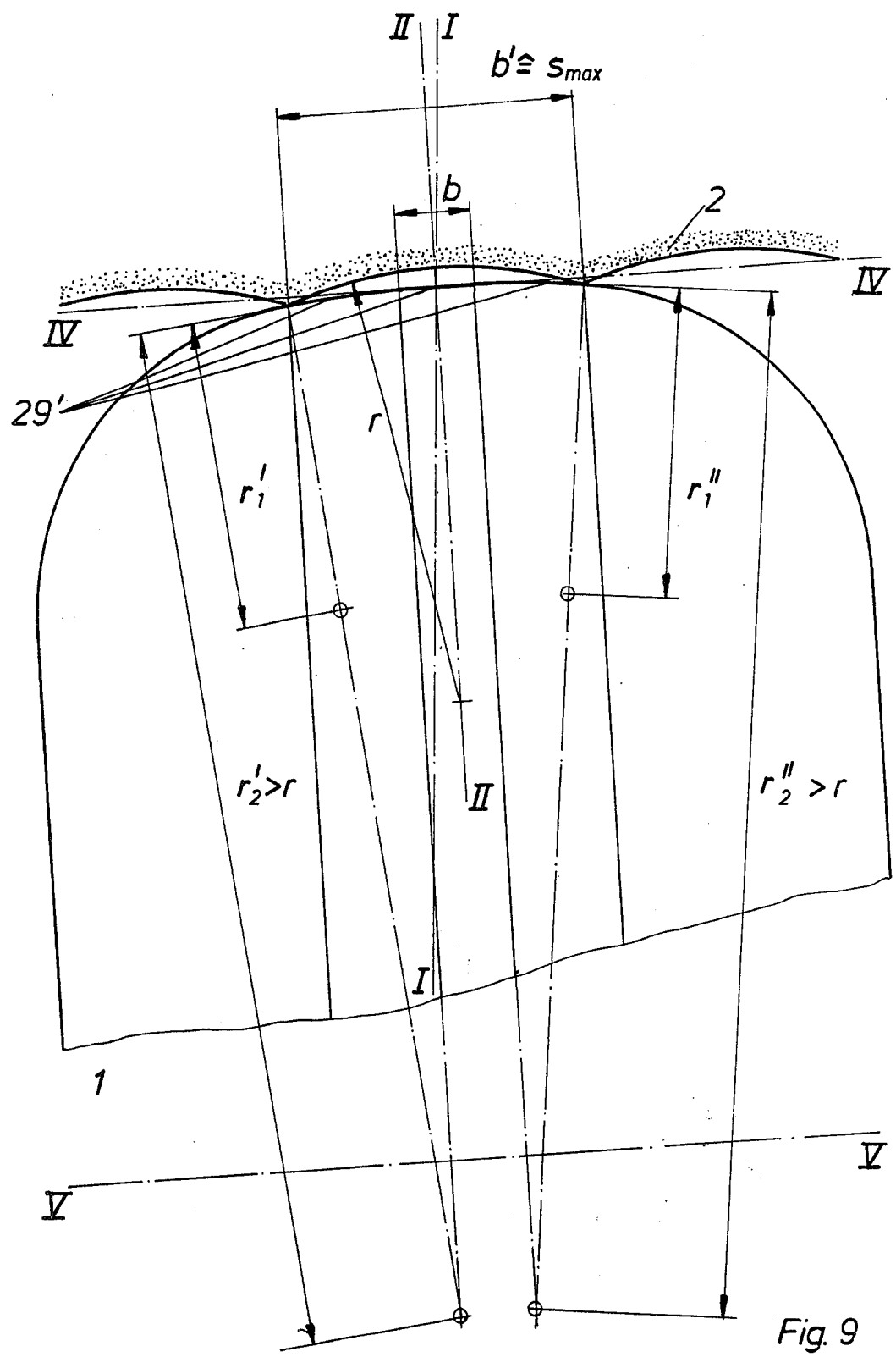
FIG. 9 is a fragmentary, partly section and partly diagrammatic view, showing the profile and the position of a metering wheel according to the present invention.

Coming to the embodiment of the invention as illustrated in FIG. 9, it will be seen that here the usable measuring surface 29' of each metering wheel 1 (only one shown) is a composite of a straight cylindrical portion $b$ at the opposite sides of which they are located catenary-curve portions that merge into the portion $b$ at a tangent. The width of the portion $b$ equals the smallest diameter between the crests of grooves on the wheel rims 2, and the center plane II—II passing through the portion $b$ is arranged at right angles to the profile inclination of the wheel rims 2. It intersects the measuring plane I—I in a line which is tangent to the tread circle diameter to be measured.

During one revolution of the set of workpiece wheels having the wheel rims 2 the surface portion $b$ rides on and traces that crest whose circumference is bisected by the plane I—I and whose spacing from the laterally adjacent crest is equal to the width of the portion $b$. Each of the caternary-curve portions is composed of two curved sections, one of which is located immediately adjacent the portion $b$ at a tangent thereto and has a radius $r_{2'}$, or $r_{2''}$ that is equal to or greater than the radius of the profile of the grooves formed in the wheel rims 2, that is of the curvature of the cutting edge on the tool that has formed these grooves. Each of the other curved portions has a radius $r_{1'}$ or $r_{1''}$, respectively, which can be selected at will. The total width $b'$ of the effective measuring face of the metering wheel 1, composed of the portion $b$ and the adjacent identically wide portions having the radii $r_{2'}$ and $r_{2''}$ is approximately equal to the maximum spacing between two adjacent ones of the crests bounding the grooves in the wheel rims 2.

The actual effective measuring diameters of the two metering wheels 1 of a single apparatus should be identical, but their approximation to the nominal diameters based upon the decadic measuring system used is only secondary. This is of importance insofar as it makes is possible to repair the metering wheels 1 when they have become worn. As pointed out previously, the primary concern of the present invention is with determining the difference between the diameters of the two wheel rims 2 of a set of workpiece wheels. The behaviour of a set of wheels when rolling on a track is dependent upon this diameter difference. The absolute diameter of each wheel rim 2 is only of secondary consideration. Of course, in order to be able to measure the absolute diameter, the diameter of the metering wheel 1 used for the measurement must be precisely known. To be able to determine the diameter difference between the wheel rims 2 of a set of workpiece wheels, such precision is not necessary.

Over a period of time the metering wheels 1 are subject to wear and are then no longer suitable for a precise measurement over the absolute diameter of the respective wheel rims 2. However, the metering wheels 1 can be re-worked, for instance by grinding, so that their diameter difference is within the range that can be calculated according to the explanations given earlier in this specification; in such a case the diameter difference measurement between the diameters of the two wheel rims 2 of a set of wheels can still be carried out with the necessary precision, using the re-worked metering wheels 1. In such a case it is simply necessary to proceed with the measurement as if the precise diameter of the metering wheels 1 were still present. The measuring error in the measuring of the absolute diameter is without consequence for the information that is sought, namely the difference in the diameters between the wheel rims 2.

For example, let it be assumed that the diameter of the left-hand wheel rim 2 of a set of wheels being measured is 1000 mm, and the diameter of the corresponding right-hand wheel rim is 999.8 mm. Let it further be assumed that the diameter of the metering wheels 1 is exactly 100 mm from each wheel, then the measured indication for the left-hand wheel rim 2 will show a wheel rim diameter of 1000 mm whereas that for the right-hand wheel rim 2 will show a wheel rim diameter of 999.8 mm. Consequently, the diameter difference amounts to 0.2 mm.

Let it now, by way of a contrasting example, be assumed that the diameters of the left and right-hand wheel rims 2 are as before, namely 1000 mm and 999.8 mm, respectively but that the diameters of the metering wheels 1 are not 100 mm but instead are 99.7 mm in both instances. If under these circumstances the wheel rims 2 are measured as before, the diameter of the left-hand wheel rim 2 will be indicated as 103.0 mm and the diameter of the right-hand wheel rim 2 will be indicated as 1002.8 mm. The diameter difference will therefore again be 0.2 mm. From this it follows that in terms of the diameter difference, which is the only feature that is of interest in the context of the present invention, there is no difference in the measurement obtained, despite the fact that the absolute diameter for each of the wheel rims 2 has been measured incorrectly. This indicates that even though the metering wheels 1 have been worn and their diameters have changed from their original diameters, they can continue to be used as long as they have been re-worked so that they have diameters which are identical with one another.

It will be understood that each of the elements described above, or two or more together, may also find a useful application in other types of constructions differing from the types described above.

While the invention has been illustrated and described as embodied in an apparatus for simultaneously measuring the outer diameter of sets of profiled wheels, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An apparatus for simultaneously measuring the outer diameter of a set of profiled wheels having conical tread surfaces, which are produced by a turning operation and therefore are formed at the tread surfaces with circumferentially extending grooves, said apparatus comprising a pair of generally cylindrical metering wheels having nominally identical diameter and width, the effective measuring width of each of said cylindrical metering wheels being substantially equal to the square root of the product 1.6 times the permissible tread diameter difference between the wheels of said set times the radius of a rounded cutting edge of a tool used for turning said surfaces, and the permissible diameter difference of said metering wheels being substantially equal to the product of the nominal diameter of said metering wheels times 20% of the permissible diameter difference of the tread diameters divided by the nominal tread diameter; and means mounting said metering wheels for turning movement about respective axes of rotation extending parallel to the generatrix of the respective conical tread surface.

2. An apparatus as defined in claim 1, wherein each of said generally cylindrical metering wheels comprises a central cylindrical portion and two arcuate face portions respectively located at opposite sides of said cylindrical portion and each having a section adjacent said cylindrical portion of a radius of curvature greater than the curvature of the cutting edge of the tool used in turning said profiled wheels and forming said grooves.

* * * * *

UNITED STATES PATENT AND TRADEMARK OFFICE
CERTIFICATE OF CORRECTION

PATENT NO. : 4,110,910

DATED : September 5, 1978

INVENTOR(S) : Theodor Dombrowski

It is certified that error appears in the above-identified patent and that said Letters Patent are hereby corrected as shown below:

In the heading [63] and in Column 1, second line under the heading "CROSS-REFERENCE TO RELATED APPLICATION", change the date to read -- November 20, 1974 --.

In the heading [30] change the date to read -- November 23, 1973 --.

Signed and Sealed this

Eighth Day of May 1979

[SEAL]

Attest:

RUTH C. MASON
*Attesting Officer*

DONALD W. BANNER
*Commissioner of Patents and Trademarks*